United States Patent [19]

Gerstenkorn

[11] Patent Number: 5,016,686
[45] Date of Patent: May 21, 1991

[54] METHOD AND APPARATUS FOR LOADING PARTICULATE MATERIALS

[75] Inventor: Ralph Gerstenkorn, Garden Grove, Calif.

[73] Assignee: Atlantic Richfield Company, Los Angeles, Calif.

[21] Appl. No.: 418,064

[22] Filed: Oct. 6, 1989

[51] Int. Cl.$^5$ .......................................... B65G 65/32
[52] U.S. Cl. ........................................ 141/96; 141/95; 222/64; 193/30; 414/294; 414/328
[58] Field of Search ............................ 141/94–96; 222/64, 55, 56; 414/291, 143.1, 293–296, 328, 329; 198/524; 193/3, 25 C, 30

[56] References Cited

U.S. PATENT DOCUMENTS

| | | | |
|---|---|---|---|
| 2,415,328 | 2/1947 | Andersen et al. | 222/64 X |
| 2,674,396 | 4/1954 | Peterson | 222/56 |
| 2,696,606 | 12/1954 | De La Pomelie | 414/294 X |
| 3,446,937 | 5/1969 | Hugentobler | 222/64 X |
| 3,858,733 | 1/1975 | Morioka et al. | 414/291 |
| 3,867,969 | 2/1975 | Garnett | 141/59 |
| 3,902,436 | 9/1975 | Turner et al. | 414/296 X |
| 3,926,290 | 12/1975 | Isojima et al. | 193/27 |
| 3,985,245 | 10/1976 | Schulte | 414/21 |
| 4,014,578 | 3/1977 | Grott et al. | 406/127 |
| 4,061,221 | 12/1977 | Higashinaka et al. | 198/524 |
| 4,281,946 | 8/1981 | Kanics | 406/95 |
| 4,288,318 | 9/1981 | Essmann et al. | 209/139.1 |
| 4,342,383 | 8/1982 | Burnett | 193/32 |
| 4,378,897 | 4/1983 | Kattleman | 222/56 |
| 4,390,090 | 6/1983 | Kossebau | 193/32 |
| 4,400,268 | 8/1983 | Stache et al. | 209/236 |
| 4,410,076 | 10/1983 | West et al. | 193/32 |
| 4,449,863 | 5/1984 | Ullner | 406/182 |
| 4,459,071 | 7/1984 | Norton et al. | 406/108 |
| 4,520,883 | 6/1985 | Fukuda | 222/56 X |
| 4,569,432 | 2/1986 | Zentgraf et al. | 193/32 |
| 4,599,017 | 7/1986 | Russemeyer et al. | 406/95 |
| 4,629,392 | 12/1986 | Campbell et al. | 141/94 X |
| 4,727,913 | 3/1988 | Bliss | 141/7 |
| 4,821,861 | 4/1989 | Shanahan | 193/25 E |

FOREIGN PATENT DOCUMENTS

| | | | |
|---|---|---|---|
| 2167130 | 7/1987 | Japan | 414/296 |
| 63-60816 | 3/1988 | Japan | 414/296 |
| 0861247 | 9/1981 | U.S.S.R. | 414/295 |

*Primary Examiner*—Henry J. Recla
*Assistant Examiner*—Casey Jacyna
*Attorney, Agent, or Firm*—Tom F. Pruitt

[57] ABSTRACT

Methods and apparatus for loading particulate materials, in particular calcined coke, into a transport vehicle are disclosed, wherein the loading operation under steady state conditions is carried out in a "plugged chute" mode, so that a major portion of the loading chute is maintained in a filled condition with the particulate material being loaded. In this manner, the product drop height is maintained at an acceptably low level so as to reduce the velocity of the particulate material throughout the loading process below a damaging rate and thereby prevent significant degradation of the material. In a preferred embodiment, the major portion of the loading chute comprises a telescoping chute arrangement and level control means located above the major portion of the loading chute is employed to maintain the chute in the plugged or full condition by regulation of the discharge valve when the telescoping chute arrangement is fully extended. Conventional level control means located near the discharge end of the major portion of the chute may be employed during particular phases of the loading operation (in particular, when the telescoping chute arrangement is retracted). Switching means is suitably provided to permit instantaneous change from the plugged chute loading mode to conventional loading.

3 Claims, 1 Drawing Sheet

METHOD AND APPARATUS FOR LOADING PARTICULATE MATERIALS

BACKGROUND OF THE INVENTION

This invention relates to apparatus and methods for loading particulate materials, such as mineral ore, from storage locations into transport vehicles. In particular, the present invention relates to improvements in methods and apparatus for use in loading materials such as calcined coke into cargo vessels by means of a loading chute.

Various types of loading chutes are known for transporting particulate materials into the hold of a transport vessel. Movement of the materials from a reservoir or storage area is typically effected via loading means (such as a belt conveyor) to a point above the transport vehicle. The chute is generally mounted so that the material is then allowed to fall through a discharge means into the chute.

The chute should be movable so as to prevent the burying of the end of the chute in the cargo. In addition, it is necessary to move the chute to permit "topping off" of the load by filling in the corners of the hold, as well as any other interstices in the mass of particulate materials.

A particularly advantageous type of chute has a telescoping structure, wherein a plurality of unit ducts of successively enlarged or decreased horizontal cross section are nested together. To maintain the ducts in association when the chute is fully extended, each duct may be provided for example with flanges, which cause the engagement of each duct with an adjacent duct. In a preferred arrangement, these flanges are of a design such that upon retraction of the chutes, for example by means of a pulley arrangement, the uppermost flanges stack up together. Such an arrangement of nesting ducts is disclosed, for example, in U.S. Pat. No. 3,926,290 to Isojima et al., the disclosure of which is hereby incorporated by reference. In practice, lift motor means is generally also provided to facilitate retraction of the telescoping duct assembly.

A particular problem encountered in the loading of many particulate materials, and in particular such products as calcined coke, is the generation of substantial quantities of fines and dust due to product degradation. Various solutions have been proposed to control the emission of dust discharged into the atmosphere as the material descends from the loading means into the transport vehicle. One common approach is to enclose the chute in a flexible conduit provided at one end thereof with, e.g., aspirator means. A countercurrent of air is generated by the aspirator means, whereby a significant portion of the dust may be collected and transported to a disposal means, such as a filter. Such a flexible conduit surrounding a loading chute and provided with a connection for aspirator means or the like is disclosed in U.S. Pat. No. 4,727,913 to Bliss, the disclosure of which is also hereby incorporated by reference.

While an arrangement as described in the aforementioned U.S. Pat. No. 4,727,913 as comprising part of the prior art thereto may be useful in suppressing dust discharged from the stream of falling material (especially when lower density bulk materials are loaded), it is further noted in the patent that in the case of denser bulk materials major portions of fines and dust are generated when the falling material impacts with the pile being deposited in the transport vehicle. Not only does this dust create potential environmental and safety hazards, but there is also a substantial likelihood of economic loss due to the degradation of product into fines and dust. To reduce the generation of dust at impact still further, U.S. Pat. No. 4,727,913 proposes the use of first and second tubular members coaxially disposed within a central hopper at the discharge end of a loading chute, whereby the flow of particulate matter is retarded in bottleneck fashion and material forced to pile up within the hopper is ultimately discharged through annular spaces between the hopper and first tubular member and/or the first and second tubular members, respectively.

With respect to coke, it has been determined that particle breakage is a direct function of the distance over which the material drops during the loading process. The amount of fines generated during a simulated loading process varied from 0% at zero fall height to about 35% at 120 feet. Significantly, about one-half the total degradation occurring at a 120 foot drop occurred in drop heights below 25 feet; thus, even small drop heights are significant contributors to size degradation.

Whereas a dust suppressing device as proposed in U.S. Pat. No. 4,727,913 may be useful in deflecting excess bulk material falling through a loading chute and reducing its velocity prior to its impact with the pile of material in the transport vehicle being loaded, such an arrangement still does not address the problem of excessive drop distances. Indeed, the device as described in the patent merely changes the point of impact of the particulate materials from the floor of the transport vehicle to an internal location in the loading chute arrangement. Even with this modification, the drop distance for the particulate material being loaded into the transport vehicle remains essentially the same: approximately 70 feet from the downspout to the bottom of the hold of the ship. As a consequence, a dust suppressing device in accordance with U.S. Pat. No. 4,727,913 would be useful primarily in controlling any dust generated, rather than in actually preventing the generation of fines and dust.

Accordingly, it is an object of the present invention to permit the loading of particulate materials, in particular calcined coke, onto transport vehicles in manner such that product degradation is substantially minimized.

SUMMARY OF THE INVENTION

In accordance with the present invention, the product drop height in a telescoping loading chute as conventionally employed for introduction of particulate materials into a transport vehicle is maintained at an acceptably low level to reduce the velocity of the particulate material throughout the loading process below a damaging rate and thereby prevent significant degradation of the material. This is achieved by operating throughout substantially the entire initial loading operation (i.e., under so-called steady state conditions) in a "plugged chute" mode, whereby a major portion of the loading chute is maintained in a filled condition with the particulate material being loaded. In a preferred embodiment, level control means located above the telescoping portion of the loading chute is employed to maintain the chute in the plugged or full condition while the telescoping chute is in extended position.

To facilitate the topping off of the transport vehicle, according to a further preferred embodiment of the invention conventional level control means located near the discharge end of the telescoping portion of the chute is employed when the chute is in retracted position and product drop height is substantially less than during conventional loading operations in the extended position of the chute. Switching means is suitably provided to permit instantaneous change from the plugged chute loading mode to conventional loading.

DETAILED DESCRIPTION OF THE INVENTION

Figure 1:
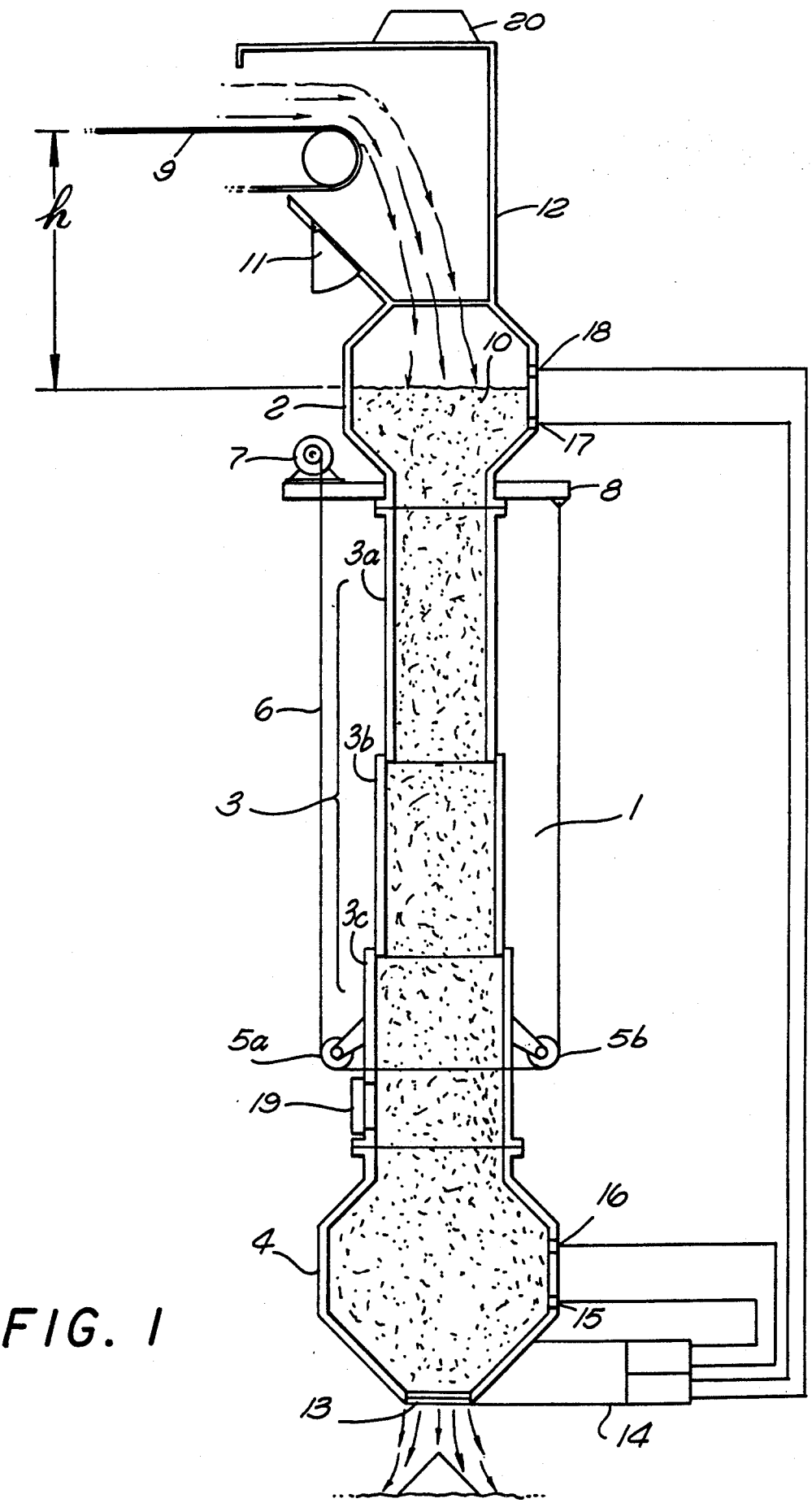
FIG. 1 illustrates in schematic form a preferred embodiment of a loading chute modified in accordance with the present invention.

Pursuant to the present invention, a significant reduction in product degradation during the loading of particulate materials, in particular calcined coke, onto transport vessels through suitable modification of conventional loading chute means including a telescoping portion. A wide variety of telescoping loading chutes may suitably be employed in accordance with the present invention, and the particular design of the telescoping portion of the loading chute is not critical. As previously noted, one suitable design for the stacked ducts comprising the telescoping portion of the loading chute is illustrated in U.S. Pat. No. 3,926,290. In such an arrangement, the individual ducts have a generally rectangular cross-section and increase in size in the direction of product discharge. The particular design of the telescoping chute is not critical and other suitable arrangements are also clearly within the scope of the present invention, provided that the resultant chute is of sufficiently sturdy construction so as to permit the loading operation to proceed both when the telescoping chute is fully extended and when the telescoping portion has been retracted. These conventional telescoping loading chutes may be made of a variety of different materials, as is well known in the art; for purposes of loading calcined coke, one preferred material is stainless steel. In general, the length of the telescoping chute in retracted condition will be on the order of one-half to one-third or less of the length of the chute in extended condition.

Referring to FIG. 1, one embodiment of a ship loading chute 1 in accordance with the present invention is illustrated with the telescoping portion thereof in extended condition. As illustrated, the chute 1 comprises a product charge hopper 2, a telescoping portion 3 (comprising in the illustrated embodiment three stacked ducts 3a–3c), and a product discharge hopper 4. Both product charge hopper 2 and product discharge hopper 4 must be of sufficiently large size so that normal variations in the rate of introduction of product into the loading chute may be accommodated. As is well known in the art, the appropriate size for the product charge hopper 2 and the product discharge hopper 4 is a function of the rate of product flow and of anticipated flow rate fluctuations. In particular, the product charge hopper 2 and product discharge hopper 4 should be sufficiently large to avoid adverse effects on level sensing means (as hereinafter described), such as false or premature readings, due to variations in flow rate.

Extension and retraction of the telescoping portion of the chute is effected in the illustrated embodiment in a manner known per se using pulley means 5a, 5b (provided on duct 3c in this embodiment), cable means 6 and lift means 7 (for example, a suitable lift motor); of course, alternative arrangements are equally suitable for this purpose and the mechanics of extension and retraction is not critical to the present invention. As illustrated, in one embodiment of the loading chute one end of cable means 6 and lift means 7 may suitably be connected to a platform 8 associated with product charge hopper 2.

Conveyor means 9 (e.g., a belt conveyor in the illustrated embodiment) is employed to introduce particulate material 10 into the product charge hopper 2. To prevent extensive damage to the system in the event of a significant blockage in the loading chute and a resultant excessive accumulation of product, at least one product relief door 11 is suitably provided in an upper portion of the product charge hopper 2 and/or conduit means 12 leading thereto; in the illustrated embodiment, a single product relief door 11 is depicted upstream of the product charge hopper 2, although in general a plurality of product relief doors symmetrically disposed around the periphery of the loading chute 1 would be employed to facilitate rapid product discharge. As explained hereinafter, product relief door 11 is actuated only when the level of particulate material 10 in the loading chute 1 has accumulated well beyond normal operating levels, and then primarily only when the loading chute 1 is operating in the so-called "plugged" mode.

Particulate material 10 introduced into product charge hopper 2 in general traverses the length of telescoping portion 3 under the influence of gravity and enters product discharge hopper 4. Valve means 13 is provided at the distal end of product discharge hopper 4 to modulate the flow of particulate material 10 from the loading chute 1 into the transport vehicle. Valve control means 14 serves to open and close valve means 13 in response to, e.g., electrical signals received from product sensors in the loading chute 1 upstream of the valve means 13 (in a manner as hereinafter described). Suitable arrangements for controlling the discharge of particulate materials are well known in the art, and the particular design and construction of valve means 13 is not critical to the present invention. For example, valve means 13 may be operated electronically, hydraulically or pneumatically. One exemplary valve arrangement is described in U.S. Pat. No. 4,342,383 to Burnett, the disclosure of which is hereby incorporated by reference. In this exemplary system, the valve comprises an array (preferably conical or funnel-shaped in axial section) of downwardly and inwardly sloping movable blades. Although in the system described in U.S. Pat. No. 4,342,383 the lower ends of the blades define an opening between them, it is contemplated that for use in accordance with the present invention the blades have a design such that no opening is present when the blades are closed. In lieu of spring biasing means operatively responsive to the weight of the accumulated mass of particulate materials as described in the patent, moreover, rotation of the blades is directed by valve control means 14. In a typical system, the blades may rotate vertically through an arc of up to about 90° from a fully-opened to a fully-closed position. Alternative arrangements (for example, valve means comprising blades or vanes which move laterally rather than vertically) are also clearly contemplated as within the scope of the present invention. Particularly suitable valve means and valve control means are available under the designation Chokefeeder TM from Midwest International, Charlevoix, Mich.

Valve control means 14 is operatively connected to a first set of level sensors disposed at or near the periphery of product discharge hopper 4 and comprising first low level sensor means 15 and first high level sensor means 16; generally, each of the level sensor means comprises a plurality of individual level sensors. As is well known in the art, these level sensors may take a variety of different forms. For example, in certain systems capacitance sensing means may be employed to monitor the level of particulate material 10. Alternatively, diaphragm type level sensors actuated by the mass of collected product may be particularly suitable for use in systems as described herein.

An arrangement of level sensors located near the point of discharge for control of the level of particulate material is conventional in the art, and one exemplary embodiment thereof is described in U.S. Pat. No. 3,858,733 to Morioka et al., the disclosure of which is hereby incorporated by reference. As described therein, first low level sensor means 15 operates in conjunction with valve control means 14 so as to maintain valve means 13 in a closed position whenever the level of particulate material 10 in product discharge hamper 4 is below a predetermined minimum level. When valve means 13 is closed, particulate material 10 continues to accumulate in product discharge hamper 4. First high level sensor means 16, in turn, cooperates with valve control means 14 so as to open valve means 13 when the level of particulate material 10 accumulating in product discharge hamper 4 exceeds a preset maximum level. Discharge of particulate material 10 continues until the level is below the predetermined minimum, whereupon valve means 13 is again closed and accumulation in product discharge hamper 4 is resumed. In this manner, it is possible to maintain the level of particulate material 10 near the point of discharge within a predetermined range. This arrangement may be suitably employed when, for example, the telescoping portion 3 of the loading chute 1 is fully retracted and the entire chute is being moved for purposes of topping off the transport vessel.

The conventional arrangement of level sensors as just described near the point of discharge of the particulate material 10 (such as is disclosed in U.S. Pat. No. 3,858,733) does not, however, permit operation of a loading chute in a "plugged" mode, as has been found particularly advantageous for steady-state loading operations. Accordingly, pursuant to the present invention there is also provided a second set of level sensors comprising second low level sensor means 17 and second high level sensor means 18. Ideally, this second set of level sensors is located upstream of the telescoping portion 3 of loading chute 1; in the illustrated embodiment, second low level sensor 17 and second high level sensor 18 are both located on or near the periphery of product charge hamper 2. While this second set of level sensors operates in a manner strictly analogous to the first set of level sensors, because of the location of the second set of level sensors a full load of particulate material 10 is maintained throughout the telescoping portion 3 and product discharge hamper 4 whenever opening of valve means 13 is dependent upon second high level sensor 18. By setting the maximum level for accumulation of particulate materials 10 sufficiently high (for example, 10 feet or less from the point of introduction of the particulate material 10 into the loading chute), product drop height (h in FIG. 1) is kept low and product degradation is reduced to a level no greater than that encountered at various transfer points in the conveying system.

In accordance with a preferred embodiment of the invention, valve control means 14 is designed in a manner so as to permit essentially instantaneous switching from operation in a conventional loading mode (i.e., using the lower level sensors) to operation in a plugged mode (using the upper level sensors), or the reverse. Thus, for example, after steady-state loading in the plugged mode for a period of time sufficient to fill the transport vehicle substantially while minimizing product degradation, the loading operation may be switched over to conventional level control and the telescoping portion 3 of the loading chute may be retracted. With the telescoping portion 3 of the loading chute 1 retracted, the overall length of the loading chute is substantially reduced, thereby facilitating movement thereof; in particular, the likelihood of damage to the loading chute 1 (which would be present if the loaded chute were to swing into contact with, e.g., an external wall of the transport vehicle) is greatly minimized. Moreover, when the telescoping portion 3 of the loading chute is fully retracted, the product drop height is substantially less than would be the case when particulate material 10 is loaded via a fully extended chute under conventional level control.

In accordance with preferred embodiments of the present invention, additional modifications may be made in the system to ensure maximum efficiency and safe operation. Thus, for example, in the illustrated embodiment a second product relief door 19 is provided at a position slightly upstream of the lower level controls 15, 16 to permit discharge of accumulated product in the event of, e.g., a blockage in normal flow when the loading chute 1 is in the conventional control mode. Of course, second product relief door 19 should be designed so as not to be actuatable when the loading chute 1 is in the plugged chute control mode. Therefore, whereas product relief door 11 may be actuated simply by the weight of accumulated product, second product relief door 19 should be provided by some type of bypass control such that it is responsive to accumulated product level only when the loading chute 1 is in the conventional mode of operation.

In addition, in the illustrated embodiment air exhaust means 20 is advantageously provided for removal from the system of air displaced from loading chute 1 by particulate material introduced therein. To minimize the release to the atmosphere of dust inevitably produced due to the unavoidable (albeit substantially minimized) product degradation inherent in product transport, filter means may be provided to trap small particulates entrained in the displaced air. Further, loading chute 1 may be encased in some type of dust entrapment casing, such as a flexible conduit of the type disclosed in U.S. Pat. No. 4,727,913.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A loading chute for loading particulate material into a transport vehicle, comprising:
   a product charge hopper;
   a major chute portion having a first end in communication with said product charge hopper and a second, opposite end;
   a product discharge hopper having a first end in communication with said second end of said major chute portion and a second, opposite end;
   valve means for controlling discharge of said particulate material from said second end of said product discharge hopper;
   lower level control means for determining when said particulate material accumulates above a predetermined maximum or falls below a predetermined minimum level, said lower level control means being located downstream of said major chute portion;
   upper level control means for determining when said particulate material accumulates above a predetermined maximum or falls below a predetermined minimum level, said upper level control means being located upstream of said major chute portion; and
   valve control means for regulating said valve means in response to said lower level control means or said upper level control means, each of said lower and upper level control means comprising at least one low level sensor means for determining when particulate material falls below a predetermined minimum level and at least one high level sensor means for determining when particulate material accumulates above a predetermined maximum level, wherein said valve control means causes said valve means to close when said at least one low level sensor means senses a predetermined minimum level and said valve control means causes said valve means to open when said at least one high level sensor means senses a predetermined maximum level, said valve control means further including switching means for changing which of said lower level control means and said upper level control means controls said valve control means.

2. A loading chute according to claim 1, wherein said major chute portion comprises a telescoping chute arrangement.

3. A loading chute according to claim 2, further comprising:
   means for extending and retracting said telescoping chute arrangement.

* * * * *